(12) United States Patent
Kim, Jr.

(10) Patent No.: US 11,614,612 B2
(45) Date of Patent: Mar. 28, 2023

(54) MODULAR BINOCULAR NIGHT VISION DEVICE

(71) Applicant: TNVC, Inc., Redlands, CA (US)

(72) Inventor: Agustine E. Kim, Jr., Wadmalaw Island, SC (US)

(73) Assignee: TNVC, Inc., Redlands, CA (US)

( * ) Notice: Subject to any disclaimer, the term of this patent is extended or adjusted under 35 U.S.C. 154(b) by 189 days.

(21) Appl. No.: 17/151,184

(22) Filed: Jan. 17, 2021

(65) Prior Publication Data

US 2021/0239962 A1  Aug. 5, 2021

Related U.S. Application Data

(60) Provisional application No. 62/963,015, filed on Jan. 18, 2020.

(51) Int. Cl.
*G02B 23/12* (2006.01)
*G02B 23/18* (2006.01)

(52) U.S. Cl.
CPC .............. *G02B 23/18* (2013.01); *G02B 23/12* (2013.01); *G02B 23/125* (2013.01)

(58) Field of Classification Search
CPC ...... G02B 23/125; G02B 23/12; G02B 23/18; G02B 2027/0138; G02B 27/0176
See application file for complete search history.

(56) References Cited

U.S. PATENT DOCUMENTS

| | | | | |
|---|---|---|---|---|
| 3,971,933 A | * | 7/1976 | Adamson, Jr. | G02B 23/125 313/51 |
| 5,943,174 A | * | 8/1999 | Bryant | H01J 29/98 359/809 |
| 6,288,386 B1 | * | 9/2001 | Bowen | G02B 23/12 313/532 |
| 7,219,370 B1 | * | 5/2007 | Teetzel | A42B 3/042 2/6.2 |
| 7,726,994 B1 | * | 6/2010 | Willey | H01M 50/20 439/218 |
| 8,087,100 B2 | * | 1/2012 | Aguero | G02B 23/125 2/422 |

(Continued)

FOREIGN PATENT DOCUMENTS

EP  1832189 A1 * 9/2007 ............... A42B 3/04

*Primary Examiner* — Christopher Stanford
(74) *Attorney, Agent, or Firm* — Asgaard Patent Services, LLC; F. Wayne Thompson, Jr.

(57) ABSTRACT

A modular binocular night vision device permits vision during low-light conditions by converting incoming near-infrared and visible light from a viewed scene to an intensified visible light image. The modular binocular night vision device comprises a pair of monocular housings, connected to one another by way of a bridge, that are arranged for respectively covering the right and left eye of an observer. Each monocular housing contains an identical optical system. An example modular binocular night vision device comprises the bridge and a mount module used to attach the modular binocular night vision device to a helmet. The bridge includes a mechanical connection port on a top side thereof. The mount module includes a base and an onboard power source. The base is removeably attachable to the mechanical connection port on the bridge and the onboard power source is adapted to provide power to the binocular night vision device.

5 Claims, 10 Drawing Sheets

(56) References Cited

U.S. PATENT DOCUMENTS

| | | | | |
|---|---|---|---|---|
| 8,677,516 | B2* | 3/2014 | Prendergast | A42B 3/04 |
| | | | | 248/674 |
| 8,830,575 | B2* | 9/2014 | Rivkin | G02B 23/125 |
| | | | | 359/415 |
| 8,984,665 | B2* | 3/2015 | Celona | A42B 3/04 |
| | | | | 2/6.2 |
| 9,203,063 | B2* | 12/2015 | Celona | H01M 50/20 |
| 9,622,529 | B2* | 4/2017 | Teetzel | A42B 3/04 |
| 9,778,453 | B2* | 10/2017 | Teetzel | G02B 23/125 |
| 10,886,646 | B2* | 1/2021 | Goupil | H05K 1/0274 |
| 11,131,843 | B2* | 9/2021 | Lasky | G02B 23/125 |
| 11,360,309 | B2* | 6/2022 | Goupil | G02B 27/0172 |
| 2008/0007826 | A1* | 1/2008 | Smith | G02B 23/125 |
| | | | | 359/407 |
| 2012/0114983 | A1* | 5/2012 | Stokes | H01M 50/269 |
| | | | | 429/50 |
| 2021/0127774 | A1* | 5/2021 | Schroder | G02B 27/0176 |

* cited by examiner

MODULAR BINOCULAR NIGHT VISION DEVICE

CROSS REFERENCE TO RELATED APPLICATION

This application claims the benefit of U.S. Provisional Application Ser. No. 62/963,015, filed on Jan. 18, 2020, the entirety of which is incorporated herein by reference.

TECHNICAL FIELD

This disclosure relates to implementations of a modular binocular night vision device. In particular, the present invention provides for a binocular night vision device comprising a removable mount module having an onboard power source attached to the bridge.

BACKGROUND

Modern night vision devices permit vision during low-light conditions by converting incoming near-infrared and visible light from a viewed scene to an intensified visible light image. Night vision devices having a pair of monocular assemblies, routinely referred to as binocular night vision devices, offer several advantages. The use of two monocular assemblies provides for an increased field of view and allows for depth perception (i.e., stereopsis). Depth perception increases a user's ease in maneuvering terrain and obstacles, as well as operating devices such as control panels and door knobs.

To facilitate handsfree use, night vision devices equipped with an appropriate mount are routinely attached to a helmet, or other headwear, equipped with a compatible interface. The mount, or mount system, is selected based on the night vision device being used, the interface to which the night vision device is to be attached, and user preference(s). Therefore, a night vision device having a bridge that can be adapted for use with different mounts, or mount system, would be desirable. Further, since night vision devices are optoelectronic devices, a removable mount module attachable to the bridge that includes an onboard power source would also be desirable.

Accordingly, it can be seen that needs exist for the modular binocular night vision device disclosed herein. It is to the provision of a modular binocular night vision device configured to address these needs, and others, that the present invention is primarily directed.

SUMMARY OF THE INVENTION

A modular binocular night vision device permits vision during low-light conditions by converting incoming infrared and/or visible light from a viewed scene to an intensified visible light image. The modular binocular night vision device comprises a pair of monocular housings, connected to one another by way of a bridge, that are arranged for respectively covering the right eye and the left eye of an observer. Each monocular housing contains an identical optical system. The modular binocular night vision device further comprises a mount module that is removably attachable to the bridge. The mount module includes a mount for releasably attaching the modular binocular night vision device to a helmet, and an onboard power source for the modular binocular night vision device.

An example modular binocular night vision device comprises a bridge and a mount module. The bridge includes a mechanical connection port on a top side thereof; the mount module includes a base and an onboard power source. The base of the mount module is removably attachable to the mechanical connection port on the bridge and the onboard power source is adapted to provide power to the binocular night vision device.

Another example modular binocular night vision device comprises a bridge and a mount module. The bridge includes a mechanical connection port on a top side thereof, the mechanical connection port comprises a bottom surface that extends between a first side wall and a second side wall. The mount module includes a base and an onboard power source. The base of the mount module is removably attachable to the mechanical connection port on the bridge and configured to fit between the first side wall and the second side wall thereof. The onboard power source of the mount module is adapted to provide power to the binocular night vision device.

An example modular binocular night vision device comprises a bridge and a mount module. The bridge includes a mechanical connection port on a top side thereof. The mechanical connection port comprises a bottom surface that extends between a first side wall and a second side wall. The bottom surface includes two openings therein and the first and second side walls each include a socket. The mount module includes a base and an onboard power source. The base is removably attachable to the mechanical connection port on the bridge and includes two lugs that extend therefrom. Each of the two lugs is configured to be received within one of the two openings in the bottom surface of the mechanical connection port. Each of the two lugs includes a tab that extends therefrom configured to be received within the socket of the first side wall or the second sidewall. The onboard power source is adapted to provide power to the binocular night vision device.

BRIEF DESCRIPTION OF THE DRAWINGS

Like reference numerals refer to corresponding parts throughout the several views of the drawings.

DETAILED DESCRIPTION

FIGS. 1-5 illustrate an example implementation of a modular binocular night vision device 100 according to the principles of the present disclosure. The modular binocular night vision device 100 permits vision during low-light conditions by converting incoming near-infrared and visible light from a viewed scene to an intensified visible light image.

As shown in FIGS. 1-5, in some implementations, the modular binocular night vision device 100 comprises a pair of monocular housings 110, 112, connected to one another by way of a bridge 114, that are arranged for respectively covering the right eye and the left eye of an observer. Each monocular housing 110, 112 contains an identical optical system. The modular binocular night vision device 100 further comprises a mount module 116 that is removably attachable to the bridge 114. The mount module 116 includes a mount 118 for releasably attaching the modular binocular night vision device 100 to a helmet, and an onboard power source 120 for the modular binocular night vision device 100.

The optical system contained within each monocular housing 110, 112 includes three primary optical structures: an objective optical system 122; an image intensifier tube (not shown), and an eyepiece optical system 126. The objective optical system 122 is designed to receive light from an observed scene and to transfer an image of the scene to the photocathode side of the image intensifier tube. The image intensifier tube makes it possible for an observer to view the scene in low-light conditions by receiving the infrared and/or visible light image of the scene. The image intensifier tube converts the received image to an intensified visible output image that is transferred to the eyepiece optical system 126. The eyepiece optical system 126 presents the intensified visible output image to an eye of the observer. In this way, the observer is provided an intensified field of view of the scene being observed.

Figure 7:
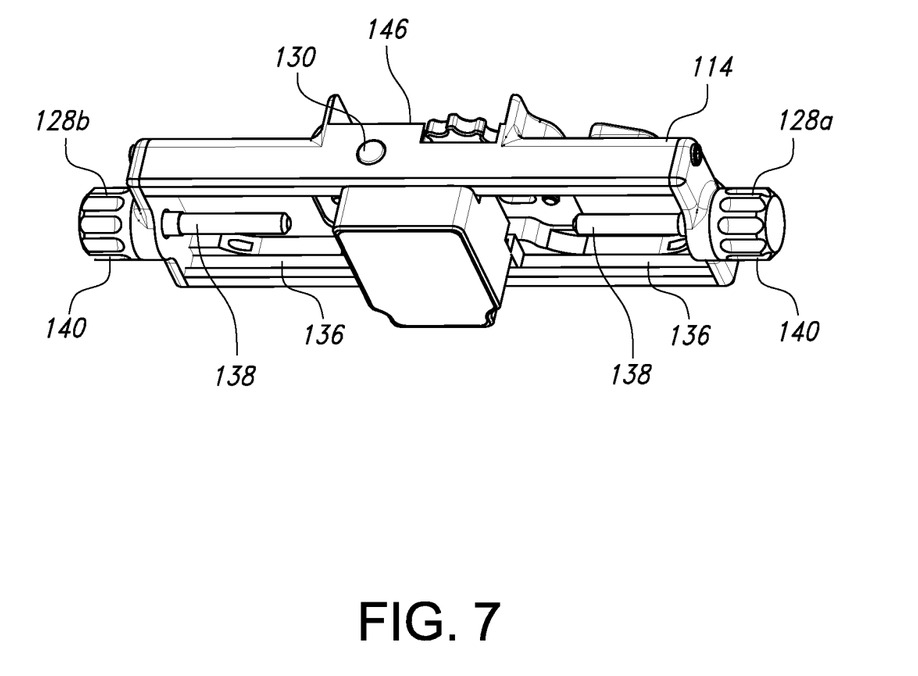
FIGS. 7 and 8 illustrate the bridge of the modular binocular night vision device shown in FIGS. 1-5.
Figure 8:
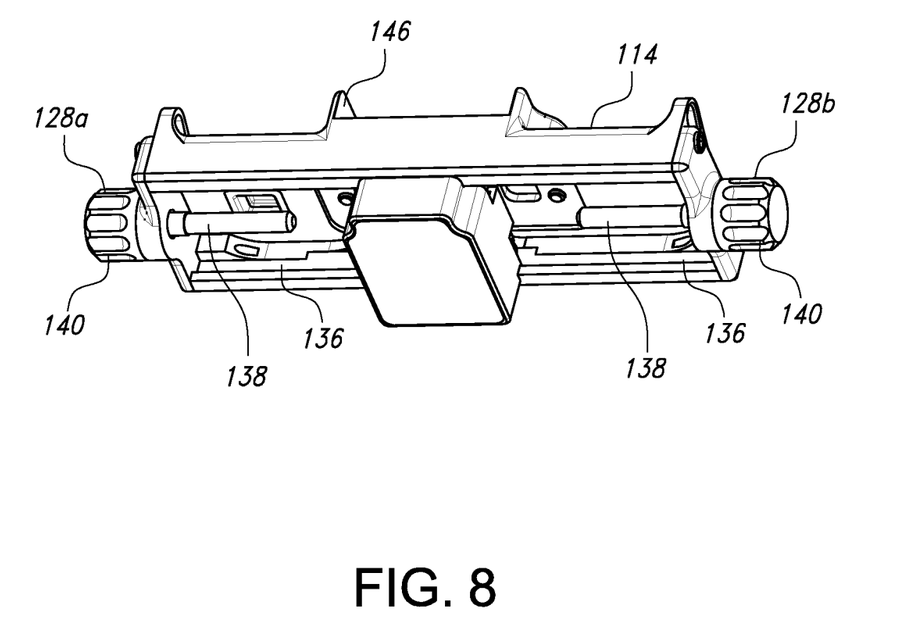

As shown in FIGS. 1-6, the monocular housings 110, 112 are mirror images of each other and are connectable directly to the bridge 114. To accommodate different users, the bridge 114 includes well known mechanisms 128a, 128b for adjusting the interpupillary distance between the optical systems in the two monocular housings 110, 112 (see, e.g., FIGS. 6-8). In a preferred implementation, each monocular housing 110, 112 is mechanically connected to the bridge 114. As shown best in FIGS. 6-8, the mechanical connection may include tongue-and-groove type connectors (134, 136), by which each monocular housing 110, 112 is slidably secured to the bridge 114. A worm screw 138, rotatable by an attached adjustment knob 140, extends through an opening 144 in a base 142 of each monocular housing 110, 112. Due to this arrangement of mechanical components, each adjustment knob 140 can be used to laterally shift the operably connected monocular housing 110, 112 and thereby the optical system contained therein. In this way, interpupillary distance between the optical systems can be adjusted.

Figure 1:
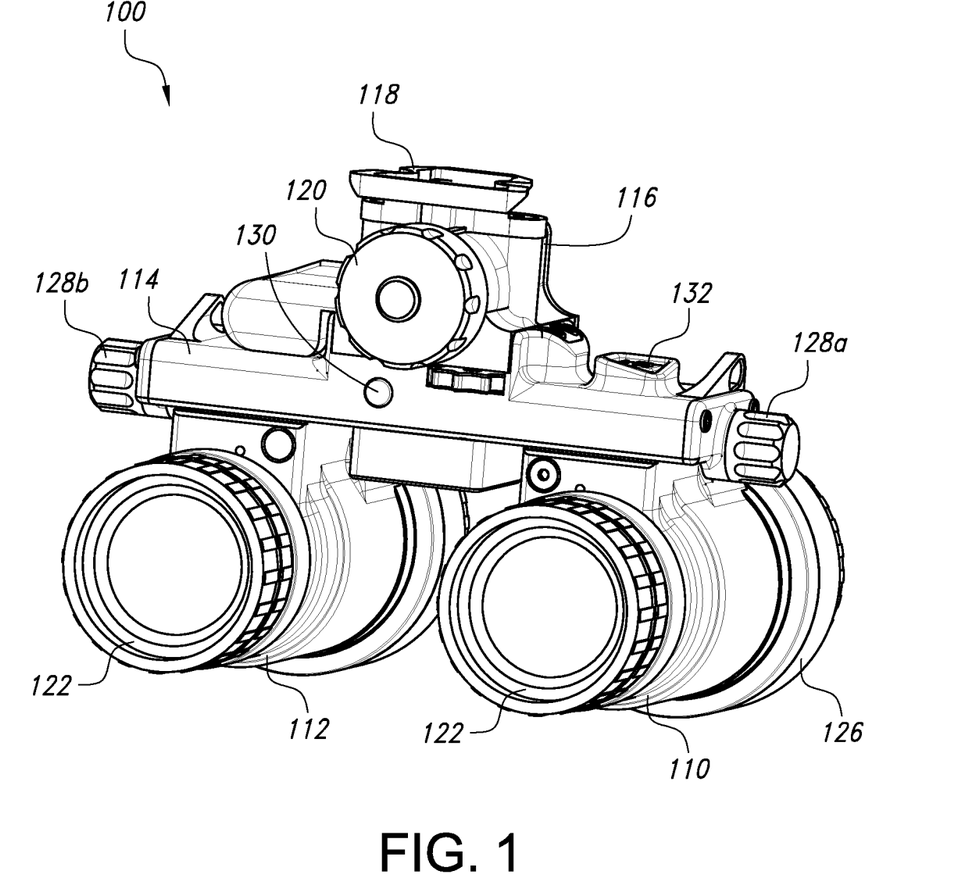
FIGS. 1-5 illustrate an example modular binocular night vision device according to the principles of the present disclosure.
Figure 4:
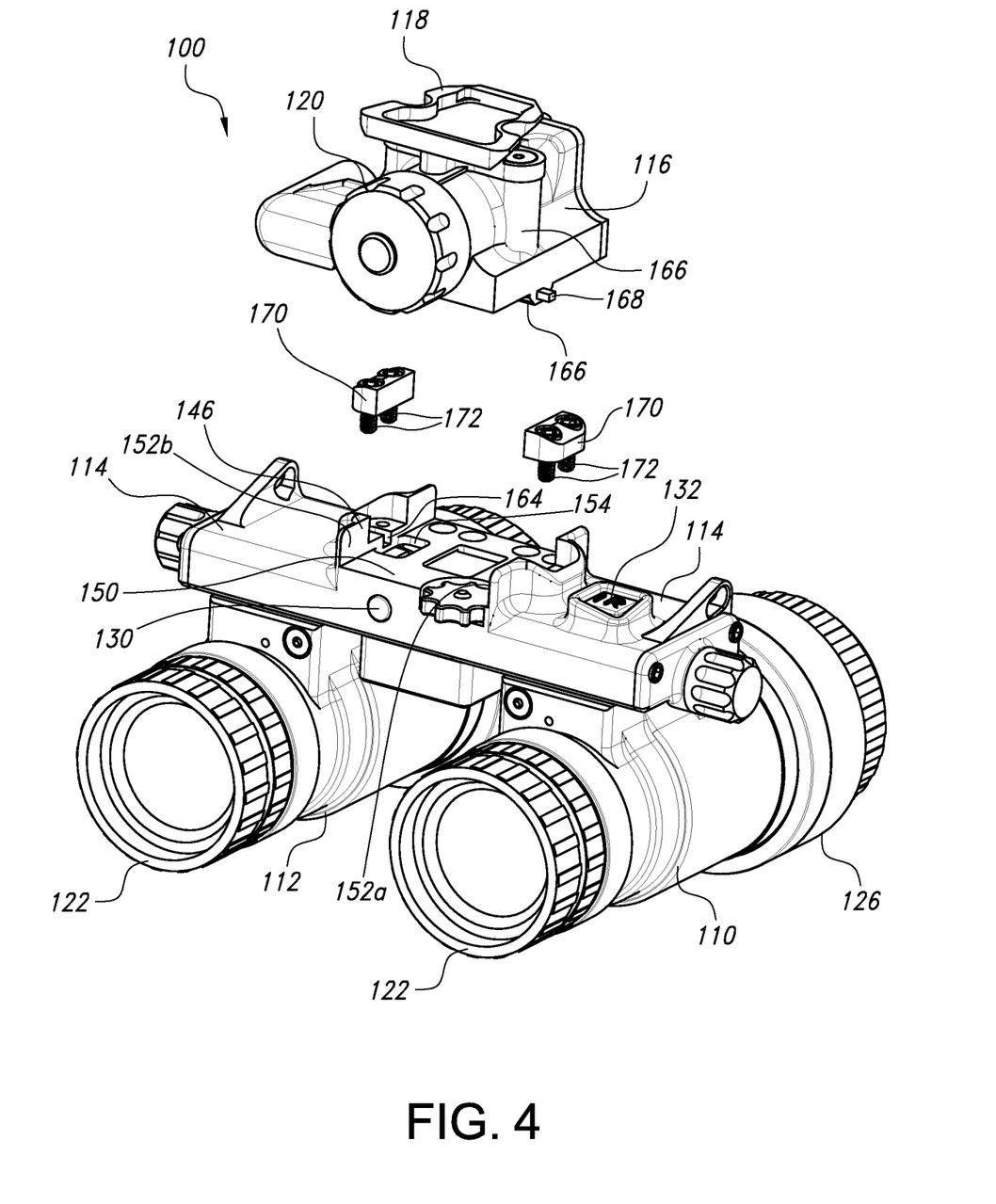
Figure 6:
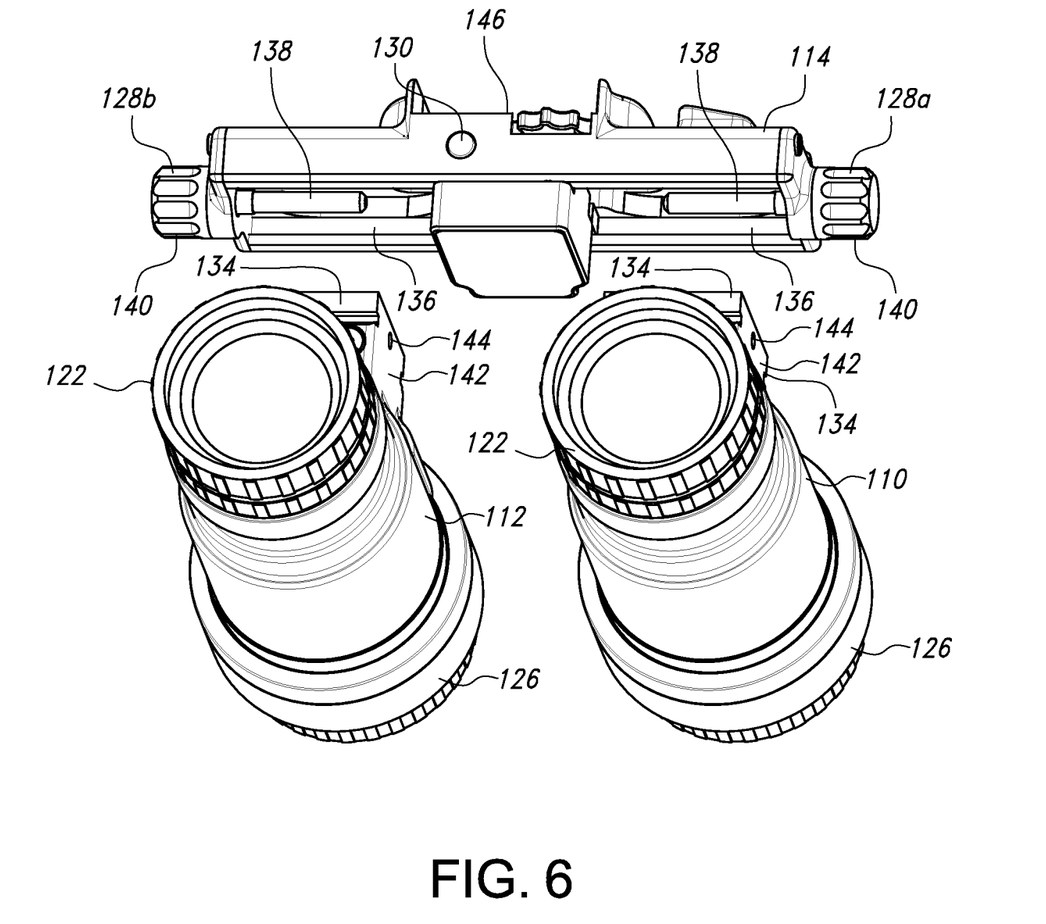
FIG. 6 illustrates a view of the monocular housings exploded from the bridge of the modular binocular night vision device shown in FIGS. 1-5.

As shown in FIGS. 1, 4 and 6, in some implementations, the bridge 114 may include an infrared (IR) illuminator 130 that is conductively connected to a switch 132. When energized, the IR illuminator 130 emits infrared illumination that is reflected by objects and received by the optical systems of the modular binocular night vision device 100. The switch 132 (preferably a CONSTANT ON/OFF switch) carried by the bridge 114 is actuable for causing a connected power source (e.g., the onboard power source 120) to energizer the IR illuminator 130.

Figure 5:
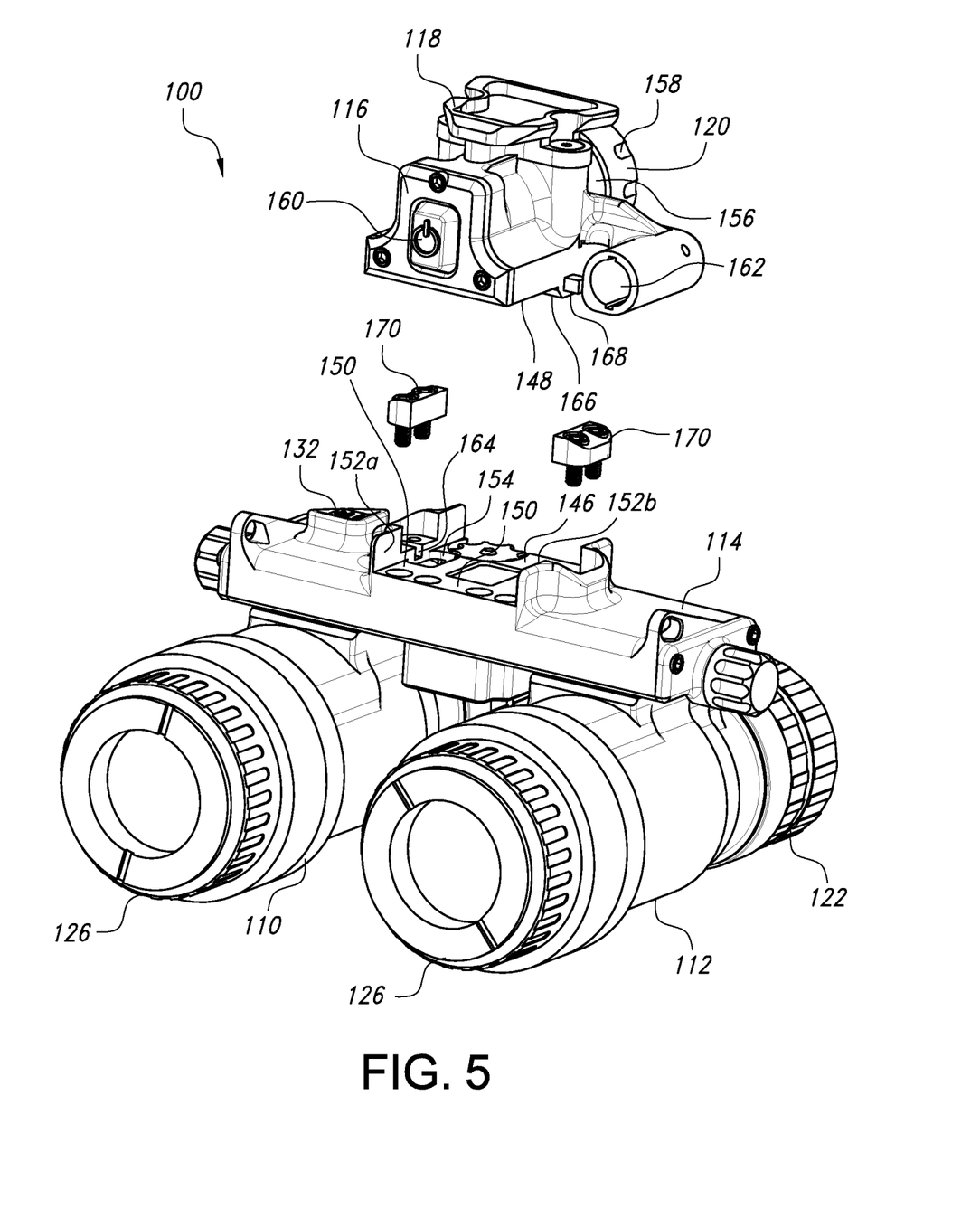

As shown best in FIGS. 4 and 5, in a preferred implementation, the bridge 114 also includes a mechanical connection port 146 on a top side thereof that is configured to releasably receive the mount module 116. The mount module 116 includes a base 148 that is removably attachable to the mechanical connection port 146 on the bridge 114. In some implementations, the mechanical connection port 146 of the bridge 114 comprises a bottom surface 150 that extends between a first side wall 152a and a second side wall 152b (collectively side walls 152). The bottom surface 150 of the mechanical connection port 146 includes two openings 154 therein that may have a generally rectangular shape. Each side wall 152a, 152b includes a socket 164 positioned adjacent one of the openings 154 in the bottom surface 150 of the mechanical connection port 146. The base 148 of the mount module 116 includes two lugs 166 that extend therefrom. Each of these lugs 166 is positioned and configured to be received within a corresponding opening 154 in the bottom surface 150 of the mechanical connection port 146. Each lug 166 includes a tab 168 extending therefrom that is positioned and configured to be received within the corresponding socket 164 in an adjacent side wall (152a or 152b) of the mechanical connection port 146. In some implementations, the tabs 168 extending from the lugs 166 may be opposite ends of a metal rod extending through an opening in the base 148 of the mount module 116. Each tab 168 is retained within its receiving socket 164 by a clamp member 170 secured to the bridge 114 by, in some implementations, a pair of threaded fasteners 172. In this way, through the use of the clamp members 170, the lugs 166 and tabs 168 of the mount module 116 are held in position within the openings 154 and sockets 164, respectively, of the mechanical connection port 146.

Figure 9:
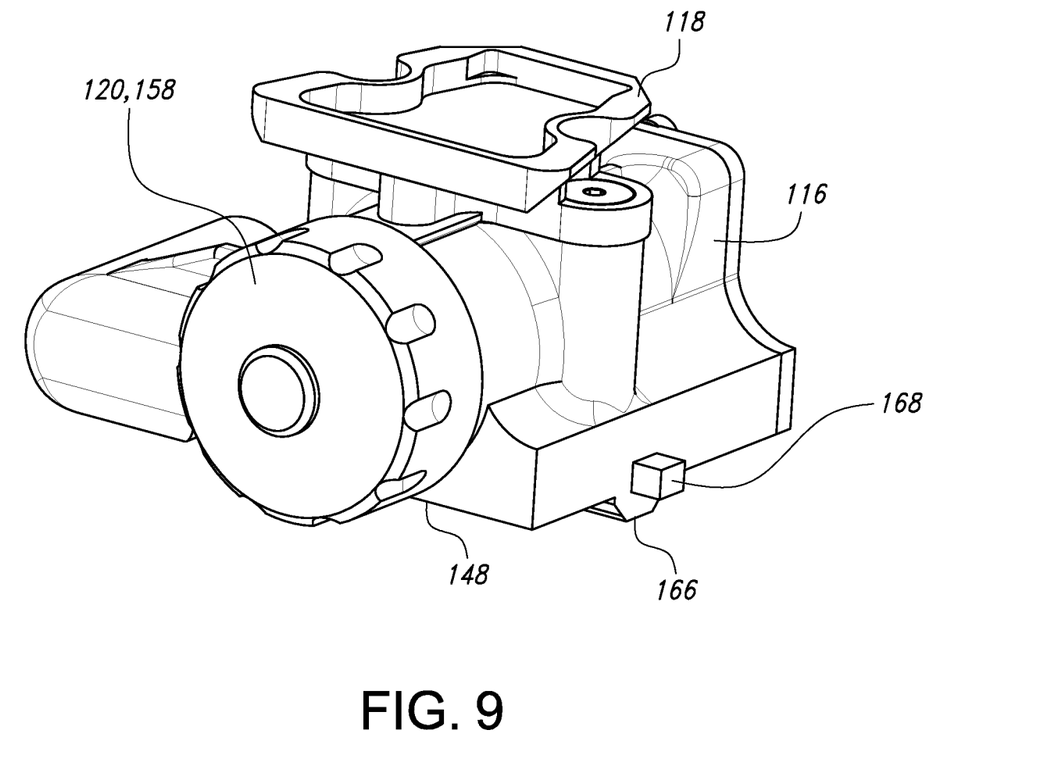
FIGS. 9 and 10 illustrate the mount module of the modular binocular night vision device shown in FIGS. 1-5.
Figure 10:
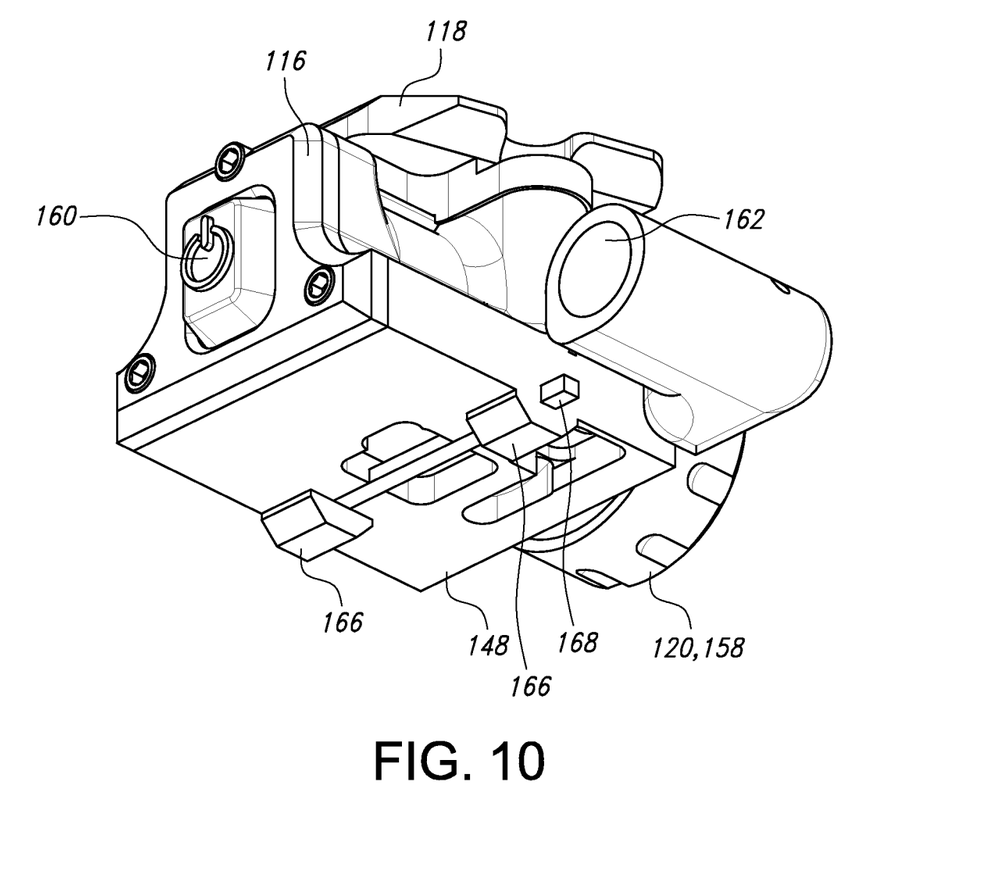

As shown in FIGS. 5 and 9, the mount 118 of the mount module 116 is an NVG interface shoe, well known to those of ordinary skill in the art, configured to be received by a compatible dovetail interface (not shown). In this way, while the mount module 116 is secured to the bridge 114, the mount 118 can be used to releasably attach the modular binocular night vision device 100 to a helmet, or other headwear, equipped with a compatible dovetail interface.

As shown in FIGS. 5 and 9, the onboard power source 120 of the mount module 116 includes a battery storage compartment 156 having a removable battery cap 158. The battery storage compartment 156 is configured to contain one or more batteries therein (i.e., a power source) that can be used to energize the modular binocular night vision device 100. The mount module 116 includes a power switch 160 (preferably a CONSTANT ON/OFF switch) used to selectively energize the electrical circuit of the modular binocular night vision device 100.

Figure 2:
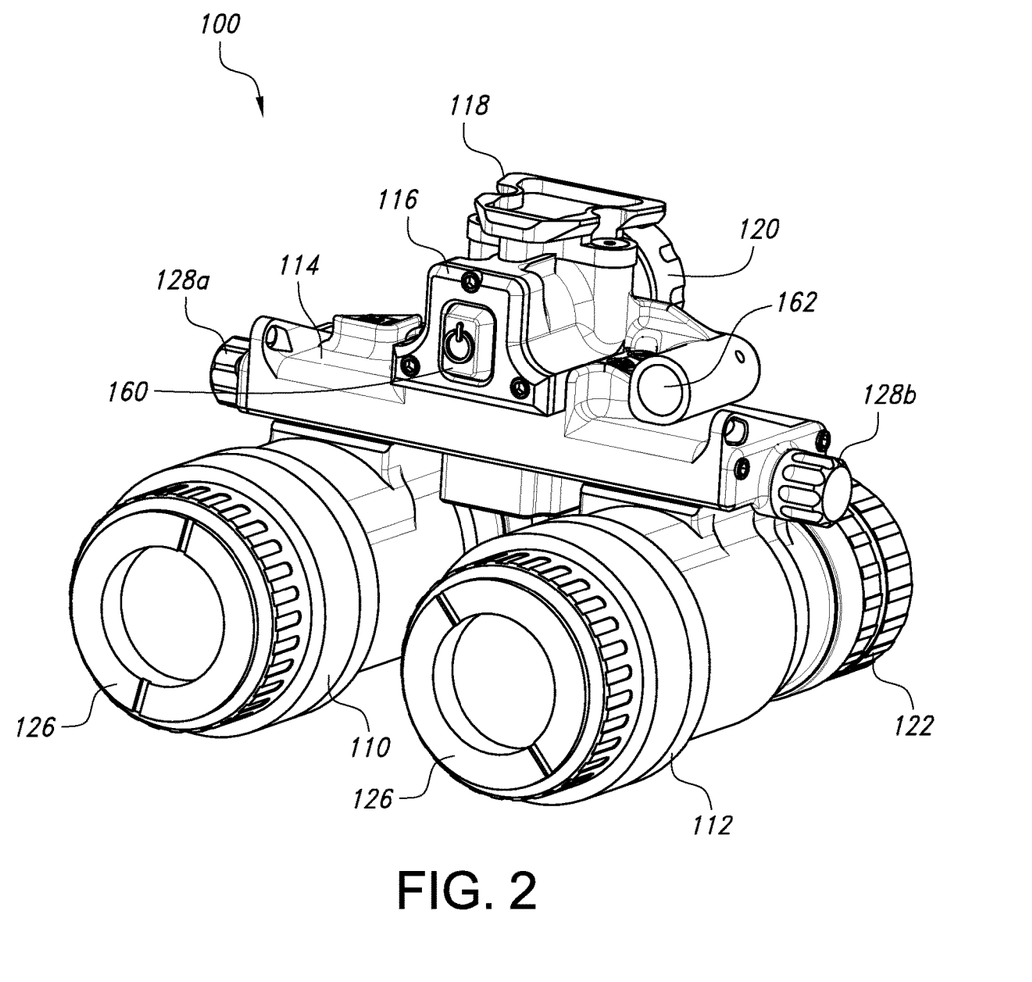
Figure 3:
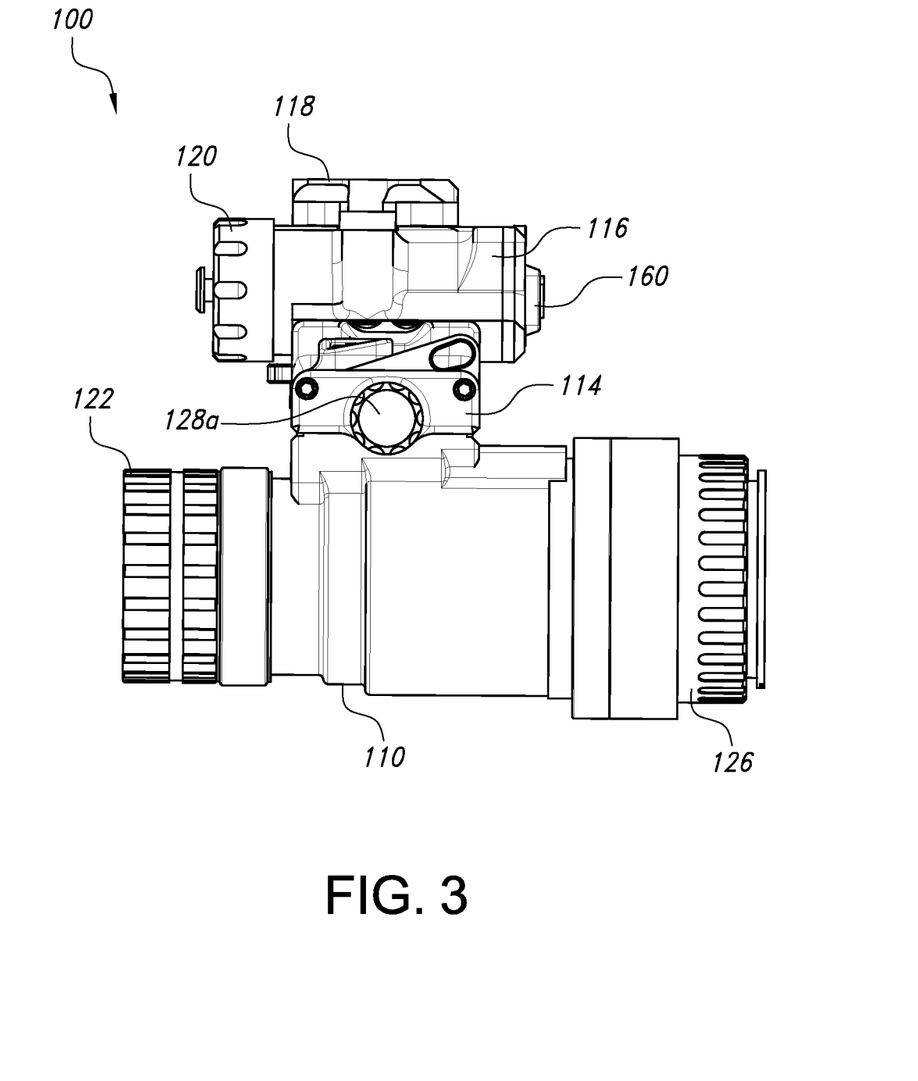

As shown in FIGS. 2 and 5, in some implementations, the mount module 116 may also include a socket 162 (e.g., a LEMO® socket connector) that is conductively connected to the electrical circuit of the night vision device 100. In this way, a remote battery pack, or other external power source, can be connected to the mount module 116 via a cable having a suitable plug (e.g., a compatible LEMO® plug connector) and used to power the modular binocular night vision device 100.

An electrical circuit for the modular binocular night vision device 100 may comprise the onboard power source 120, the power switch 160, the socket 162, the optical system contained in each monocular housing 110, 112, the IR illuminator 130, the switch 132 for the IR illuminator, or a suitable combination thereof.

Electrical power required by the modular binocular night vision device 100 is provided through electrical connectors (not shown) between the bridge 114 and the mount module 116. The electrical connectors may be spring-loaded contacts, or other suitable electrical connectors known to one of ordinary skill in the art, oriented to establish electrical communication when the mount module 116 is mechanically connected to the bridge 114. Otherwise, power is transferred between the electrical components (e.g., between the contacts of the bridge to the optical system contained in each monocular housing 110, 112) through wiring, traces, pins and sockets, or other suitable electrical connectors known to those of ordinary skill in the art.

Although not shown, in some implementations, the bridge 114 may include a gain control knob that is operably connected to the optical systems in the two monocular housings 110, 112 of the night vision device 100. In this way, the user can manually adjust the "gain" or electronic amplification of the video signal. This affects the brightness of the image presented to the user.

In an alternate implementation not shown in the drawings, a mount module 116 could be configured to include a ball-detent ANVIS-style mount, well known to those of ordinary skill in the art, instead of an NVG interface shoe 118. In this way, the mount module 116 could be used to releasably mount the night vision device 100 to a helmet, or other headwear, equipped with a ball-detent ANVIS-style interface. In such an implementation, the onboard power source 120 and/or the power switch 160 may be omitted.

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown or in sequential order, or that all illustrated operations be performed, to achieve desirable results.

The invention claimed is:

1. A binocular night vision device comprising:
   a bridge that includes a mechanical connection port on a top side thereof, the mechanical connection port comprises a bottom surface that extends between a first side wall and a second side wall, the bottom surface includes two openings therein, the first and second side walls each include a socket; and
   a mount module that includes a base and an onboard power source, the base is removably attachable to the mechanical connection port on the bridge and includes two lugs that extend therefrom, each of the two lugs is configured to be received within one of the two openings in the bottom surface of the mechanical connection port, each of the two lugs includes a tab that extends therefrom configured to be received within the socket of the first side wall or the second sidewall, the onboard power source is adapted to provide power to the binocular night vision device.

2. The binocular night vision device of claim 1, further comprising two clamp members, each of the two clamp members is configured to secure the tab extending from one of the two lugs within the socket in the first sidewall or the second sidewall of the mechanical connection port.

3. The binocular night vision device of claim 1, wherein the socket in the first sidewall is positioned adjacent a first of the two openings in the bottom surface of the mechanical connection port, and the socket in the second sidewall is positioned adjacent a second of the two openings in the bottom surface of the mechanical connection port.

4. The binocular night vision device of claim 3, further comprising two clamp members, each of the two clamp members is configured to secure the tab extending from one of the two lugs within the socket in the first sidewall or the second sidewall of the mechanical connection port.

5. The binocular night vision device of claim 1, wherein the mount module also includes an interface shoe configured for attachment to headwear having a compatible interface, the interface shoe is secured to a topside of the mount module.

\* \* \* \* \*